(12) United States Patent
Li et al.

(10) Patent No.: US 10,769,147 B2
(45) Date of Patent: Sep. 8, 2020

(54) BATCH DATA QUERY METHOD AND APPARATUS

(71) Applicant: Huawei Technologies Co., Ltd., Shenzhen (CN)

(72) Inventors: Feng Li, Beijing (CN); Lei Wang, Beijing (CN); Yun Zhang, Beijing (CN); Xiaobing Feng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 770 days.

(21) Appl. No.: 15/600,199

(22) Filed: May 19, 2017

(65) Prior Publication Data

US 2017/0255673 A1 Sep. 7, 2017

Related U.S. Application Data

(63) Continuation of application No. PCT/CN2015/094948, filed on Nov. 18, 2015.

(30) Foreign Application Priority Data

Nov. 21, 2014 (CN) .......................... 2014 1 0673523

(51) Int. Cl.
*G06F 16/2453* (2019.01)
*G06F 16/2452* (2019.01)

(52) U.S. Cl.
CPC .... *G06F 16/24542* (2019.01); *G06F 16/2454* (2019.01); *G06F 16/24524* (2019.01)

(58) Field of Classification Search
CPC .......... G06F 16/24542; G06F 16/2454; G06F 16/24524
See application file for complete search history.

(56) References Cited

U.S. PATENT DOCUMENTS

| 9,501,536 B1 * | 11/2016 | El-Helw ........... G06F 16/24542 |
| 2004/0158551 A1 | 8/2004 | Santosuosso |
| 2006/0020573 A1 | 1/2006 | Galindo-Legaria et al. |

(Continued)

FOREIGN PATENT DOCUMENTS

| CN | 102521409 A | 6/2012 |
| CN | 102609493 A | 7/2012 |

(Continued)

*Primary Examiner* — Apu M Mofiz
*Assistant Examiner* — Husam Turki Samara
(74) *Attorney, Agent, or Firm* — Slater Matsil, LLP

(57) ABSTRACT

A batch data query method and apparatus are provided. According to the method, multiple logical query plan trees corresponding to multiple query statements are obtained. The multiple logical query plan trees are divided into multiple query groups according to operators of each logical query plan tree. Logical query plan trees in each query group have the following relationship: an inter-query write-read dependency relationship, an operator overlap relationship, or an operand overlap relationship. Then, inter-query optimization is performed on the logical query plan trees in each query group, and multiple corresponding physical query plan trees are generated according to the multiple optimized logical query plan trees. Finally, physical queries are executed according to the multiple physical query plan trees, to obtain query results of the multiple query statements.

19 Claims, 5 Drawing Sheets

(56) References Cited

U.S. PATENT DOCUMENTS

| | | | |
|---|---|---|---|
| 2011/0185358 A1 | 7/2011 | Ostrovsky et al. | |
| 2013/0166589 A1 | 6/2013 | Baeumges et al. | |
| 2014/0156633 A1 | 6/2014 | Duan et al. | |
| 2014/0317085 A1* | 10/2014 | Wehrmeister | G06F 16/24544 |
| | | | 707/714 |

FOREIGN PATENT DOCUMENTS

| | | |
|---|---|---|
| CN | 103761080 A | 4/2014 |
| CN | 103914462 A | 7/2014 |

* cited by examiner

Obtain multiple logical query plan trees corresponding to multiple query statements, where each query statement is corresponding to one logical query plan tree, each logical query plan tree in the multiple logical query plan trees includes multiple operators, each operator of each logical query plan tree includes at least one operand, each operand has a data identifier, and same operands have a same data identifier ~ 201

Determine an inter-query write-read dependency relationship of each logical query plan tree according to operators of each logical query plan tree and data identifiers of operands of the operators of each logical query plan tree, group, into a first group, all logical query plan trees that have the inter-query write-read dependency relationship, group, into a second group, all logical query plan trees that do not have the inter-query write-read dependency relationship, and divide the logical query plan trees in the first group into at least one query group according to the inter-query write-read dependency relationship of each logical query plan tree in the first group ~ 202

Collect statistics about a quantity of operators in each type in each logical query plan tree in the second group, determine an operator overlapping degree between the logical query plan trees according to the quantity of operators in each type in each logical query plan tree, group, into a first subgroup, logical query plan trees in the second group that have an operator overlap relationship, group, into a second subgroup, other logical query plan trees in the second group except the logical query plan trees in the first subgroup, and divide the logical query plan trees in the first subgroup into at least one query group according to the operator overlapping degree between the logical query plan trees in the first subgroup ~ 203

CONT.
FROM
FIG. 2A

Determine an operand overlapping degree between the logical query plans in the second subgroup according to data identifiers of operands of operators of each logical query plan tree in the second subgroup, and divide the logical query plan trees in the second subgroup into at least one query group according to the operand overlapping degree between the logical query plans in the second subgroup — 204

Perform inter-query optimization on the logical query plan trees in each query group — 205

Generate multiple corresponding physical query plan trees according to multiple optimized logical query plan trees — 206

Execute physical queries according to the multiple physical query plan trees, to obtain query results of the multiple query statements — 207

FIG. 2B

BATCH DATA QUERY METHOD AND APPARATUS

CROSS-REFERENCE TO RELATED APPLICATIONS

This application is a continuation of International Application No. PCT/CN2015/094948, filed on Nov. 18, 2015, which claims priority to Chinese Patent Application No. 201410673523.2, filed on Nov. 21, 2014. The disclosures of the aforementioned applications are hereby incorporated by reference in their entireties.

TECHNICAL FIELD

Embodiments of the present disclosure relate to data warehouse query optimization technologies, and in particular, to a batch data query method and apparatus.

BACKGROUND

Currently, a representative big data query system (for example, Hive, Shark, or Impala) uses a single query statement as a base unit of parsing and optimization. A basic query processing procedure of the big data query system is as follows: first, a single read-in query statement is parsed into a logical query plan tree of a tree-like structure; then, an implementation algorithm is selected for each operator of the logical query plan tree, and an execution sequence of these operators is determined, so as to convert the logical query plan tree into a physical query plan; finally, a query execute engine executes the physical query plan and outputs a query result.

Key performance of the big data query system is query efficiency. Currently, a frequently used method for improving query efficiency of a big data query system is mainly to equivalently transform a logical query plan tree, so as to reduce a quantity of tasks in a physical query plan and to reduce an execution overhead of the tasks (which includes reducing read/write frequency of a file system, controlling an amount of data transmitted in a network and a calculation amount of a query operation, and the like). However, in a data warehouse (DWH) batch query scenario, a problem of insufficient optimization opportunities exists in a conventional processing mode in which a single query statement is used as a base unit of parsing and optimization. For example, task flow correlation optimization that is newly added to a Hive 0.12 version can bring acceleration for only three cases in total 22 query cases of a standard test set Transaction Processing Performance Council benchmark H (TPC-H), and has a specific requirement for a write manner of the cases.

Abundant inter-query optimization opportunities presented in the data warehouse batch query application scenario are in sharp contrast to insufficient intra-query optimization opportunities. The inter-query optimization opportunity is an optimization opportunity that exists between multiple query statements. In the batch query application scenario, a probability that similar query statements exist in the query statements is relatively high. Therefore, there is a large quantity of query optimization opportunities. However, in the prior art, query optimization is performed only on a single query statement. As a result, a big data query has low query efficiency.

SUMMARY

Embodiments of the present disclosure provide a batch data query method and apparatus to improve batch data query efficiency.

A first aspect of the present disclosure provides a batch data query method, including obtaining multiple logical query plan trees corresponding to multiple query statements, where each query statement is corresponding to one logical query plan tree, each logical query plan tree in the multiple logical query plan trees includes multiple operators, and each operator of each logical query plan tree includes at least one operand. The method also includes dividing the multiple logical query plan trees into multiple query groups according to operators of each logical query plan tree, where logical query plan trees in each query group have the following relationship: an inter-query write-read dependency relationship, an operator overlap relationship, or an operand overlap relationship. Additionally, the method includes performing inter-query optimization on the logical query plan trees in each query group; generating multiple physical query plan trees corresponding to the multiple optimized logical query plan trees; and executing physical queries according to the multiple physical query plan trees, to obtain query results of the multiple query statements.

According to the batch data query method and apparatus in the embodiments of the present disclosure, multiple logical query plan trees corresponding to multiple query statements are obtained. The multiple logical query plan trees are divided into multiple query groups according to operators of each logical query plan tree. The logical query plan trees in each query group obtained after the division have the following relationship: an inter-query write-read dependency relationship, an operator overlap relationship, or an operand overlap relationship. Then, the inter-query optimization is performed on the logical query plan trees in each query group, and multiple corresponding physical query plan trees are generated according to the multiple optimized logical query plan trees. Finally, physical queries are executed according to the multiple physical query plan trees to obtain query results of the multiple query statements. According to the foregoing method, the multiple logical query plan trees are grouped to increase an optimization opportunity between the logical query plan trees in the query group, and inter-query optimization is further performed on the logical query plan trees in the query group to improve query efficiency of a batch data query.

BRIEF DESCRIPTION OF THE DRAWINGS

To describe the technical solutions in the embodiments of the present disclosure more clearly, the following briefly describes the accompanying drawings required for describing the embodiments.

FIG. 2A and FIG. 2B are a flowchart of a batch data query method according to a second embodiment of the present disclosure;

DETAILED DESCRIPTION OF ILLUSTRATIVE EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure.

Methods in the embodiments of the present disclosure are mainly applied to a batch data query scenario, for example, may be applied to a data warehouse. A large quantity of batch data query opportunities exists in the data warehouse. A large amount of data exists in the data warehouse. The data is usually stored in a distributed file system.

Figure 1:
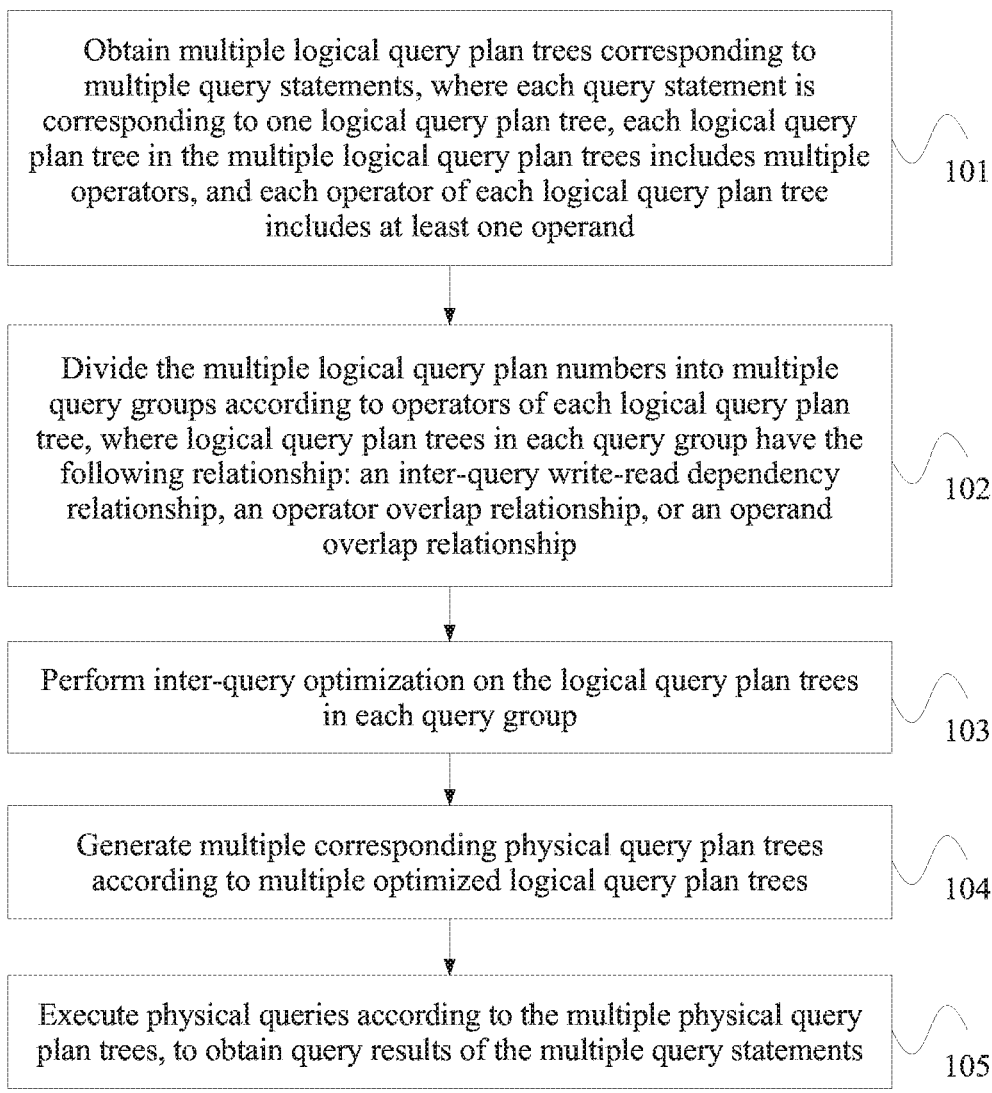
FIG. 1 is a flowchart of a batch data query method according to a first embodiment of the present disclosure.

FIG. 1 is a flowchart of a batch data query method according to a first embodiment of the present disclosure. A method provided in this embodiment may be executed by a batch data query apparatus. The batch data query apparatus is specifically a database server. As shown in FIG. 1, the method in this embodiment may include the following steps.

Step 101: Obtain multiple logical query plan trees corresponding to multiple query statements, where each query statement is corresponding to one logical query plan tree, each logical query plan tree in the multiple logical query plan trees includes multiple operators, and each operator of each logical query plan tree includes at least one operand.

Each query statement sent by a client is parsed into a logical query plan tree of a tree-like structure by a server side. The logical query plan tree includes multiple nodes. Each node is corresponding to one operator. Each operator includes one or more operands. Frequently used operators include a scan operator, a sort operator, a select operator, an aggregate operator, a product operator, a join operator, a filesink operator, and the like.

Step 102: Divide the multiple logical query plan trees into multiple query groups according to operators of each logical query plan tree, where logical query plan trees in each query group have the following relationship: an inter-query write-read dependency relationship, an operator overlap relationship, or an operand overlap relationship.

In this embodiment, if a data identifier of an operand whose value is determined by a filesink operator from one logical query plan tree is the same as a data identifier of a specific operand of a scan operator from another logical query plan tree, the two logical query plan trees have a write-read dependency relationship. If operators of one logical query plan tree are the same as those of another logical query plan tree, the two logical query plan trees have an operator overlap relationship. If data identifiers of all or some operands of one logical query plan tree are the same as those of another logical query plan tree, the two logical query plan trees have an operand overlap relationship. A quantity of same operators that the two logical query plan trees having the operator overlap relationship have is referred to as an operator overlapping degree. A quantity of same data identifiers that the two logical query plan trees having the operand overlap relationship have is referred to as an operand overlapping degree.

The method in this embodiment is as follows: based on a result of inter-query flow analysis, a data identifier is added for each operand of each operator of each logical query plan tree in the multiple logical query plan trees by using the flow analysis, so as to determine a write-read dependency relationship, an operator overlap relationship, and an operand overlap relationship between the logical query plan trees according to operators of each logical query plan tree and data identifiers of operands of the operators when optimization is performed on the multiple logical query plan trees; and then, the multiple logical query plan trees are grouped according to any one or a combination of the write-read dependency relationship, the operator overlap relationship, or the operand overlap relationship between the logical query plan trees, so that logical query plan trees in each query group obtained after the grouping have the following relationship: the inter-query write-read dependency relationship, the operator overlap relationship, or the operand overlap relationship. Optionally, the data identifier may be specifically a version number of an operand.

In this embodiment, the multiple logical query plan trees are grouped to increase an optimization opportunity between the logical query plan trees in each query group obtained after the grouping, so as to facilitate a next step of performing inter-query optimization on the logical query plan trees in each query group. For example, grouping is performed according to the inter-query write-read dependency relationship, so that logical query plan trees that have the inter-query write-read dependency relationship can be grouped into a query group; then, inter-query optimization is performed on the logical query plan trees according to the inter-query write-read dependency relationship, so as to avoid frequently performing a read/write operation on a distributed file system. Alternatively, grouping is performed according to the operator overlap relationship, so that logical query plan trees that have a common query subtree can be grouped into a query group; then, a result of the common query subtree may be reused when inter-query optimization is performed. Alternatively, grouping is performed according to the operand overlap relationship, so that logical query plan trees with a high operand overlapping degree can be grouped into a group; operators that have a same data identifier are combined into a task when inter-query optimization is performed, so as to reduce an overhead of accessing or operating same data.

In addition, each group has a relatively small quantity of logical query plan trees due to the grouping, so that costs and complexity of inter-query optimization can be reduced. As a result, batch query efficiency is improved, and optimization costs of a logical query plan are reduced.

Step 103: Perform inter-query optimization on the logical query plan trees in each query group.

The inter-query optimization is to perform optimization on multiple logical query plan trees in a query group as a whole, rather than performing optimization on a single logical query plan tree. That is, an optimization opportunity exists between the logical query plan trees. There are mainly the following three optimization opportunities when the inter-query optimization is performed.

A first optimization opportunity is a common query subtree, which is also referred to as a common subquery. The optimization opportunity is for logical query plan trees that have an operator overlap relationship. If in a query group, a tree structure of a first query subtree of one logical query plan tree is the same as that of a second query subtree of another logical query plan tree, and a data identifier of an operand of each operator of the first query subtree is the same as a data identifier of an operand of each operator of the second query subtree, when the first query subtree is executed before the second query subtree, the first query subtree is referred to as a common query subtree, and the second query subtree is referred to as a copy of the first query subtree; or when the first query subtree is executed after the second query subtree, the second query subtree is referred to as a common query subtree, and the first query subtree is referred to as a copy of the second query subtree.

Because the tree structure of the first query subtree is the same as that of the second query subtree, and all the operands of the first query subtree are the same as those of the second query subtree, it can be learned that a query result of the first query subtree is the same as that of the second query subtree. Therefore, an optimization opportunity for this scenario is to reuse the query result of the first query subtree and the query result of the second query subtree.

When the inter-query optimization is performed, an optimization opportunity of the common query subtree needs to be first recognized. Specifically, whether in each query group, a tree structure of a first query subtree is the same as that of a second query subtree is determined. The first query subtree and the second query subtree belong to two different logical query plan trees in a same query group. If the tree structure of the first query subtree is the same as that of the second query subtree, whether a data identifier of an operand of an operator of the first query subtree is the same as a data identifier of an operand of an operator of the second query subtree is further determined. If the data identifier of the operand of the operator of the first query subtree is the same as the data identifier of the operand of the operator of the second query subtree, the first query subtree and the second query subtree are common query subtrees. The optimization opportunity of the common query subtree is recognized.

After the optimization opportunity of the common query subtree is recognized, optimization is performed on the first query subtree and the second query subtree. Specifically, if the first query subtree is executed before the second query subtree, a successor of the second query subtree is connected to the first query subtree, the successor of the second query subtree is used as a newly-added successor of the first query subtree, and the first query subtree is deleted, so that the successor of the second query subtree reuses a query result of the first query subtree. Alternatively, if the first query subtree is executed after the second query subtree, a successor of the first query subtree is connected to the second query subtree, the successor of the first query subtree is used as a newly-added successor of the second query subtree, and the second query subtree is deleted, so that the successor of the first query subtree reuses a query result of the second query subtree.

Optimization is performed according to the optimization opportunity of the common query subtree, to avoid repeatedly querying a same query result. Therefore, a database query overhead is reduced, and database query efficiency is improved.

A second optimization opportunity is query inlining. The query inlining is an optimization opportunity for two logical query plan trees that have an inter-query write-read dependency relationship. In a distributed storage system, when written data is relatively large, a filesink operator and a scan operator occupy a high overhead. In this embodiment, optimization is performed on the two logical query plan trees that have the inter-query write-read dependency relationship, to reduce the overhead of the filesink operator and the scan operator.

The query inlining opportunity needs to be first recognized. Specifically, whether a data identifier of an operand corresponding to a filesink operator is the same as a data identifier of an operand corresponding to a scan operator in each query group is determined. The scan operator and the filesink operator belong to two different logical query plan trees in a same query group. If the data identifier of the operand corresponding to the filesink operator is the same as the data identifier of the operand corresponding to the scan operator, the logical query plan tree to which the filesink operator belongs has an inter-query write-read dependency relationship with the logical query plan tree to which the scan operator belongs. After the query inlining opportunity is recognized, the following optimization is performed according to the query inlining opportunity: directly connecting a predecessor of the filesink operator to a successor of the scan operator, and deleting the scan operator.

For example, for a pair of operators <OPw, OPr> that have an inter-query write-read dependency relationship, OPw indicates a filesink operator, OPr indicates a scan operator, and OPw and OPr respectively belong to two logical query plan trees. When inter-query optimization is not performed, after a predecessor of OPw is executed, OPw writes an output result of the predecessor of OPw into a distributed file system. Then, when OPr is executed, the output result of the predecessor of OPw needs to be read from the distributed file system, and a successor of OPr processes the read output result of the predecessor of OPw. A large amount of time needs to be taken to read/write data from/into the distributed file system, thereby reducing data query efficiency. In this embodiment, to reduce a read/write overhead in the distributed file system, a new predecessor-successor relationship is established between the predecessor of OPw and the successor of OPr. That is, the successor of OPr is directly connected to the predecessor of OPw, and the successor of OPr is used as a successor of the predecessor of OPw. In this way, after the predecessor of OPw is executed, the output result of the predecessor of OPw is directly used as input of the successor of OPr for processing, so that the output result of the predecessor of OPw does not need to be first written into the distributed file system and then be read. Therefore, the read/write overhead in the distributed file system is reduced, and query efficiency is improved.

When query inlining optimization is performed, the predecessor of OPw is directly connected to the successor of OPr, and OPr is deleted, so that the logical query plan tree to which OPw belongs and the logical query plan tree to which OPr belongs are combined into one logical query plan tree. The combined logical query plan tree may introduce new intra-query optimization. The intra-query optimization is optimization for a single logical query plan tree, typically, for example, a task-flow correlation optimization opportunity. After the new intra-query optimization is introduced, intra-query optimization may be performed on the combined logical query plan tree.

A third optimization opportunity is a correlation subquery (or Correlation Query Subtree). The optimization opportunity is for logical query plan trees that have an operand overlap relationship. If two operators of a first operator and a second operator exist in a query group, the first operator and the second operator belong to two different logical query plan trees in the same query group, and operands of the first operator and those of the second operator overlap, that is, some or all data identifiers of the operands of the first operator are the same as data identifiers of the operands of the second operator, the first operator and the second operator are referred to as mutual correlation subqueries.

The correlation subquery optimization opportunity needs to be first recognized. Specifically, whether in each query group, a data identifier of an operand of a first operator is the same as a data identifier of an operand of a second operator is determined. The first operator and the second operator belong to two different logical query plan trees in a same query group. If a data identifier of an operand of the first operator is the same as a data identifier of an operand of the second operator, the first operator and the second operator have a correlation subquery optimization opportunity.

After the correlation subquery optimization opportunity is recognized, optimization is performed according to the correlation subquery optimization opportunity: adding a combination identifier for the first operator and the second operator, so that the first operator and the second operator are combined into a same task when a physical query plan tree is generated, so as to reduce an overhead of performing a scan operation on overlapped data.

Specifically, the combination identifier may be added for the first operator and the second operator in the following two manners. In one manner, same identifier information is directly added for the first operator and the second operator. When a physical query plan tree is generated, if the two operators have the same identifier information, the two operators are combined into a same task. In the other manner, a common successor is added for the first operator and the second operator, an original successor of the first operator and that of the second operator are used as successors of the common successor, and the common successor is used as a combination identifier. When a physical query plan tree is generated, if the two operators have a common successor, the two operators are combined into a same task. The common successor may be a new operator type to be distinguished from an existing operator. The common successor does not have an actual operation function, but merely records a correspondence between the first operator and the original successor of the first operator and a correspondence between the second operator and the original successor of the second operator.

Step 104: Generate multiple physical query plan trees corresponding to the multiple optimized logical query plan trees.

After the inter-query optimization is performed on the logical query plan trees in the query group, the multiple logical query plan trees are obtained after the inter-query optimization. Then, multiple physical query plan trees are generated according to the multiple logical query plan trees obtained after the inter-query optimization. That a corresponding physical query plan tree is generated according to the logical query plan tree is the prior art, and details are not further described herein.

Step 105: Execute physical queries according to the multiple physical query plan trees, to obtain query results of the multiple query statements.

According to this embodiment, multiple logical query plan trees of multiple query statements are obtained, and the multiple logical query plan trees are divided into multiple query groups according to operators of each logical query plan tree. Logical query plan trees in each query group obtained after the division have the following relationship: an inter-query write-read dependency relationship, an operator overlap relationship, or an operand overlap relationship. Then, inter-query optimization is performed on the logical query plan trees in each query group, and multiple corresponding physical query plan trees are generated according to the multiple optimized logical query plan trees. Finally, physical queries are executed according to the multiple physical query plan trees, to obtain query results of the multiple query statements. According to the foregoing method, the multiple logical query plan trees are grouped to increase an optimization opportunity between the logical query plan trees in the query group, and inter-query optimization is performed on the logical query plan trees in the query group to improve query efficiency of a batch data query.

FIG. 2A and FIG. 2B are a flowchart of a batch data query method according to a second embodiment of the present disclosure. In this embodiment, step 102 in the first embodiment is mainly described in detail. As shown in FIG. 2A and FIG. 2B, the method in this embodiment may include the following steps.

Step 201: Obtain multiple logical query plan trees corresponding to multiple query statements, where each query statement is corresponding to one logical query plan tree, each logical query plan tree in the multiple logical query plan trees includes multiple operators, each operator of each logical query plan tree includes at least one operand, each operand has a data identifier, and same operands have a same data identifier.

For a specific implementation manner of this step, reference may be made to related description in the first embodiment. Details are not described herein again.

Step 202: Determine an inter-query write-read dependency relationship between the logical query plan trees according to operators of each logical query plan tree and data identifiers of operands of the operators of each logical query plan tree, group, into a first group, all logical query plan trees that have the inter-query write-read dependency relationship, group, into a second group, all logical query plan trees that do not have the inter-query write-read dependency relationship, and divide the logical query plan trees in the first group into at least one query group according to the inter-query write-read dependency relationship between the logical query plan trees in the first group.

In an implementation manner, if a flow analysis result includes a data identifier of each operand, a filesink operator in each logical query plan tree is first recognized. Then, whether a data identifier of each operand whose value is determined by the filesink operator of each logical query plan tree is the same as a data identifier of each operand of a scan operator of another logical query plan tree in the multiple logical query plan trees is separately determined. If the data identifier of each operand whose value is determined by the filesink operator of each logical query plan tree is the same as the data identifier of each operand of the scan operator of the another logical query plan tree in the multiple logical query plan trees, the logical query plan tree including the filesink operator has an inter-query write-read dependency relationship with the logical query plan tree including the scan operator.

In another manner, if a flow analysis result includes an inter-query write-read dependency relationship between operators from different logical query plan trees, an inter-query write-read dependency relationship exists between logical query plan trees to which each pair of operators having an inter-query write-read dependency relationship belong.

In this embodiment, the multiple logical query plan trees may be numbered, and an inter-query write-read dependency relationship between the logical query plan trees is successively determined in a sequence of numbers. For example, there are 10 logical query plan trees, and numbers are successively 1 to 10. In this case, an inter-query write-read dependency relationship between the logical query plan trees is first determined. First, whether a destination path of a filesink operator in the first logical query plan tree is empty is determined. Then, if a destination path of a filesink operator in the first logical query plan tree is not empty, whether a data identifier of an operand whose value is determined by the filesink operator in the first logical query plan tree is the same as a data identifier of at least one of all operands of a scan operator in the second logical query plan tree is determined. If the data identifier of the operand whose value is determined by the filesink operator in the first logical query plan tree is the same as the data identifier of the at least one of all the operands of the scan operator in the second logical query plan tree, the first logical query plan tree has an inter-query write-read dependency relationship with the second logical query plan tree. Then, whether the first logical query plan tree has inter-query write-read dependency relationships with each of the eight remaining logical query plan trees is successively determined. After the inter-query write-read dependency relationship between the first logical query plan tree and other logical query plan trees is determined, an inter-query write-read dependency relationship between the second logical query plan tree and other logical query plan trees is determined. The inter-query write-read dependency relationship between the logical query plan trees is successively determined according to the foregoing method. In addition, when a logical query plan tree includes no filesink operator, the logical query plan tree is skipped, and an inter-query write-read dependency relationship between a next logical query plan tree and other logical query plan trees is determined.

Each logical query plan tree may include multiple filesink operators. Therefore, each logical query plan tree may have an inter-query write-read dependency relationship with multiple logical query plan trees. After the inter-query write-read dependency relationship between the logical query plan trees is determined, all logical query plan trees that are in the multiple logical query plan trees and have the inter-query write-read dependency relationship are grouped into a first group, and logical query plan trees that do not have the inter-query write-read dependency relationship are grouped into a second group. Then, the logical query plan trees in the first group are grouped according to the inter-query write-read dependency relationship. Specifically, when grouping is performed, it is assumed that the first logical query plan tree has an inter-query write-read dependency relationship with both the second logical query plan tree and the sixth logical query plan tree, and the sixth logical query plan tree has an inter-query write-read dependency relationship with the fourth logical query plan tree. When the grouping is performed, the first logical query plan tree and the second logical query plan tree may be grouped into a query group, and the sixth logical query plan tree and the fourth logical query plan tree may be grouped into a query group; or the first logical query plan tree, the second logical query plan tree, the sixth logical query plan tree, and the fourth logical query plan tree may be grouped into a query group. A specific grouping manner is not limited in this embodiment of the present disclosure.

The logical query plan trees that have the inter-query write-read dependency relationship are divided into a query group by using this step, thereby increasing an optimization opportunity in the query group.

Step 203: Collect statistics about a quantity of operators in each type in each logical query plan tree in the second group, determine an operator overlapping degree between the logical query plan trees according to the quantity of operators in each type in each logical query plan tree, group, into a first subgroup, logical query plan trees in the second group that have an operator overlap relationship, group, into a second subgroup, other logical query plan trees in the second group except the logical query plan trees in the first subgroup, and divide the logical query plan trees in the first subgroup into at least one query group according to the operator overlapping degree between the logical query plan trees in the first subgroup.

The operator has multiple types, for example, a join operator, an aggregate operator, and a scan operator. In this embodiment, the collecting statistics about a quantity of operators in each type in each logical query plan tree in the second group is specifically collecting statistics about a quantity of times that a join operator, an aggregate operator, a scan operator, or the like of each logical query plan tree in the second group separately appears. The determining an operator overlapping degree between the logical query plan trees according to the quantity of operators in each type in each logical query plan tree is specifically: separately comparing a quantity of operators in each type in each logical query plan tree in the second group with a quantity of operators in each type in another logical query plan tree in the second group; and if the quantities of operators in each type in the two logical query plan trees in the second group are equal, using a sum of quantities of operators in the types as an operator overlapping degree between the two logical query plan trees in a comparison process. The comparison process includes a process of comparing one logical query plan tree with any other logical query plan tree in the second group. If quantities of operators in one type in the two logical query plan trees in the second group are not equal in the quantities of operators in the types, the operator overlapping degree between the two logical query plan trees is 0 in this comparison process.

The example in step 202 is still used as an example. The second group includes six logical query plan trees: the third logical query plan tree, the fifth logical query plan tree, the seventh logical query plan tree, the eighth logical query plan tree, the ninth logical query plan tree, and the tenth logical query plan tree. Statistics about a quantity of operators in each type in the six logical query plan trees is first collected. It is assumed that only statistics about quantities of operators in three types of a join operator, an aggregate operator, and a scan operator is collected. Then, a quantity of operators in each type in the third logical query plan tree is separately compared with quantities of operators in each type in the five other logical query plan trees. It is assumed that in the third logical query plan tree, a quantity of join operators is 3, a quantity of aggregate operators is 5, a quantity of scan operators is 6, the quantities of operators in the types in the third logical query plan tree are the same as quantities of operators in the types in the eighth logical query plan tree, and the quantities of operators in the types in the third logical query plan tree are not the same as quantities of operators in the types in each of the four other logical query plan trees. An operator overlapping degree between the third logical query plan tree and the eighth logical query plan tree is 3+5+6=11, and operator overlapping degrees between the third logical query plan tree and each of the four other logical query plan trees are 0. Then, operand overlapping degrees between the five remaining logical query plan trees are successively determined in each comparison process. It is assumed that in the second group, only the quantities of operators in the types in the third logical query plan tree are the same as the quantities of operators in the types in the eighth logical query plan tree, the third logical query plan tree and the eighth logical query plan tree are grouped into a first subgroup, and the third logical query plan tree and the eighth logical query plan tree are grouped into a same query group.

When there are multiple logical query plan trees in the first subgroup, the multiple logical query plan trees are divided into query groups according to an operator overlapping degree between the logical query plan trees. Logical query plan trees with a same overlapping degree are grouped into a group. For example, there are four logical query plan trees in the first subgroup. Quantities of operators in each type in the first logical query plan tree and the second logical query plan tree are the same, and an operator overlapping degree is 11. Quantities of operators in each type in the third logical query plan tree and the fourth logical query plan tree are the same, and an operator overlapping degree is 13. In this case, the first logical query plan tree and the second logical query plan tree are grouped into one query group, and the third logical query plan tree and the fourth logical query plan tree are grouped into the other query group. If all the quantities of operators in each type in the foregoing four logical query plan trees are the same, and all the operator overlapping degrees are the same, the four logical query plan trees may be grouped into one query group. In another case, although the operator overlapping degrees between the four logical query plan trees are the same, the quantities of operators in each type in the first logical query plan tree and the second logical query plan tree are not completely the same as the quantities of operators in each type in the third logical query plan tree and the fourth logical query plan tree. For example, in the first logical query plan tree and the second logical query plan tree, a quantity of join operators is 2, a quantity of scan operators is 5, and a quantity of aggregate operators is 4. In the third logical query plan tree and the fourth logical query plan tree, a quantity of join operators is 4, a quantity of scan operators is 5, and a quantity of aggregate operators is 2. Therefore, the four logical query plan trees cannot be grouped into one query group, the first logical query plan tree and the second logical query plan tree need to be grouped into one query group, and the third logical query plan tree and the fourth logical query plan tree need to be grouped into the other query group.

Step 204: Determine an operand overlapping degree between the logical query plan trees in the second subgroup according to data identifiers of operands of operators of each logical query plan tree in the second subgroup, and divide the logical query plan trees in the second subgroup into at least one query group according to the operand overlapping degree between the logical query plan trees in the second subgroup.

In an implementation manner, the determining an operand overlapping degree between the logical query plan trees in the second subgroup according to data identifiers of operands of operators of each logical query plan tree in the second subgroup may be specifically: separately comparing data identifiers of operands of operators of each logical query plan tree in the second subgroup with data identifiers of operands of operators of another logical query plan tree in the second group, to obtain an operand overlapping degree between the logical query plan trees in the second subgroup in each comparison process. Each comparison process includes a process of comparing one logical query plan tree in the second subgroup with any other logical query plan tree in the second subgroup.

The foregoing example is still used as an example. After division is performed according to the inter-query write-read dependency relationship and the operator overlap relationship between the logical query plan trees, for the remaining logical query plan trees in the second subgroup: the fifth logical query plan tree, the seventh logical query plan tree, the ninth logical query plan tree, and the tenth logical query plan tree, data identifiers of operands of operators of the fifth logical query plan tree are first compared with data identifiers of operands of operators of the seventh logical query plan tree. It is assumed that the fifth logical query plan tree has six types of data identifiers in total, the seventh logical query plan tree has five types of data identifiers in total, and three types of data identifiers of the fifth logical query plan tree are the same as data identifiers of the seventh logical query plan tree. An operand overlapping degree between the fifth logical query plan tree and the seventh logical query plan tree is 3. Then, an operand overlapping degree between the fifth logical query plan tree and each of the ninth logical query plan tree and the tenth logical query plan tree is successively determined. Then, an operand overlapping degree between the seventh logical query plan tree and each of the three other logical query plan trees is determined. The operand overlapping degree between the fifth logical query plan tree and the seventh logical query plan tree is determined. Therefore, when the overlapping degree of the seventh logical query plan tree is determined, the operand overlapping degree between the seventh logical query plan tree and the fifth logical query plan tree does not need to be determined, and only an operand overlapping degree between the seventh logical query plan tree and each of the ninth logical query plan tree and the tenth logical query plan tree needs to be determined. Finally, an operand overlapping degree between the ninth logical query plan tree and the tenth logical query plan tree is determined.

After the operand overlapping degree between the logical query plan trees in the second subgroup in each comparison process is determined, grouping is performed according to a magnitude of the operand overlapping degree, and logical query plan trees with a maximum overlapping degree are preferentially grouped into one group. For example, the operand overlapping degree between the fifth logical query plan tree and the seventh logical query plan tree is the maximum, and the maximum operand overlapping degree is 5. Then, the fifth logical query plan tree and the seventh logical query plan tree are grouped into one query group. If the overlapping degree between the fifth logical query plan tree and the ninth logical query plan tree is also 5, and the overlapping degree between the ninth logical query plan tree and the tenth logical query plan tree is 3, the ninth logical query plan tree may also be grouped into the query group, and the query group has three logical query plan trees in total. Because only the tenth logical query plan tree is left, the tenth logical query plan tree may be grouped into the query group, or the tenth logical query plan tree may be independently grouped into a query group.

It should be noted that, that sums of overlapped operands of two logical query plan trees are the same does not mean that all elements of the overlapped operands of the two logical query plan trees are the same. Therefore, after overlapping degrees between multiple logical query plan trees are the same, whether data identifiers of overlapped operands included in two logical query plan trees are the same may be further determined. For example, the operand overlapping degree between the fifth logical query plan tree and the seventh logical query plan tree is 5, and data identifiers of overlapped operands are respectively: data identifiers A, B, C, D, and E. The operand overlapping degree between the fifth logical query plan tree and the ninth logical query plan tree is also 5, but data identifiers of overlapped operands are different from the foregoing data identifiers of the overlapped operands. The data identifiers of the overlapped data of the fifth logical query plan tree and the ninth logical query plan tree include: data identifiers A, B, C, E, and F. The operand overlapping degree between the ninth logical query plan tree and the tenth logical query plan tree is 3. Therefore, when grouping is performed, the fifth logical query plan tree and the seventh logical query plan tree may be grouped into one query group, and the ninth logical query plan tree and the tenth logical query plan tree may be grouped into one query group.

In another implementation manner, an operand overlapping degree between the logical query plan trees in the second subgroup may be determined according to data identifiers of operands of scan operators of each logical query plan tree in the second subgroup. Specifically, data identifiers of operands of a scan operator of each logical query plan tree in the second subgroup are separately compared with data identifiers of operands of a scan operator of another logical query plan tree in the second subgroup, to obtain an operand overlapping degree between the logical query plan trees in the second subgroup in each comparison process. Each comparison process includes a process of comparing one logical query plan tree in the second subgroup with any other logical query plan tree in the second subgroup.

Step 205: Perform inter-query optimization on the logical query plan trees in each query group.

For a specific implementation manner of this step, reference may be made to related description in the first embodiment. Details are not described herein again.

Step 206: Generate multiple physical query plan trees corresponding to the multiple optimized logical query plan trees.

Step 207: Execute physical queries according to the multiple physical query plan trees, to obtain query results of the multiple query statements.

In this embodiment, multiple logical query plan trees are first grouped according to an inter-query write-read dependency relationship between the logical query plan trees, and logical query plan trees that have the inter-query write-read dependency relationship are grouped into a same query group. Then, the remaining logical query plan trees that do not have the inter-query write-read dependency relationship are divided according to an operator overlap relationship. Finally, logical query plan trees left after the division is performed according to the inter-query write-read dependency relationship and the operator overlap relationship are divided according to an operand overlap relationship. An optimization opportunity between logical query plan trees in a query group may be increased by using the foregoing method. Inter-query optimization is further performed on the logical query plan trees in the query group, to improve query efficiency of a batch data query. In addition, each group has a relatively small quantity of logical query plan trees due to the grouping, so that costs and complexity of inter-query optimization can be reduced. As a result, overall costs of query optimization are reduced.

In the second embodiment of the present disclosure, a grouping manner is described in detail by using an example in which grouping is performed according to three parameters: an operand overlap relationship, an operator overlap relationship, and an inter-query write-read dependency relationship between logical query plan trees. This is not limited in the present disclosure. Division may be performed according to any parameter in the foregoing three parameters. For example, when grouping is performed according to only the inter-query write-read dependency relationship, logical query plan trees that have the inter-query write-read dependency relationship are first grouped into one query group, and logical query plan trees that do not have the inter-query write-read dependency relationship are grouped into one query group. When there are a lot of logical query plan trees that do not have the inter-query write-read dependency relationship, accordingly, the group is oversized. In this case, the logical query plan trees that do not have the inter-query write-read dependency relationship may be randomly divided into some query groups. When grouping is performed according to only the operator overlap relationship, logical query plan trees with a same quantity of operators in each type are first grouped into one query group, and the remaining logical query plan trees are grouped into one query group. When grouping is performed according to the inter-query write-read dependency relationship and the operator overlap relationship, grouping is first performed according to the inter-query write-read dependency relationship, and the remaining logical query plan trees that do not have the inter-query write-read dependency relationship are grouped according to the operator overlap relationship. When grouping is performed according to the inter-query write-read dependency relationship and the operand overlap relationship, grouping is first performed according to the inter-query write-read dependency relationship, and the remaining logical query plan trees that do not have the inter-query write-read dependency relationship are grouped according to the operand overlap relationship. For a specific method for performing grouping according to the inter-query write-read dependency relationship, an operand overlapping degree, or an operator overlapping degree, reference may be made to related description in the second embodiment. Details are not described herein again.

Figure 3:
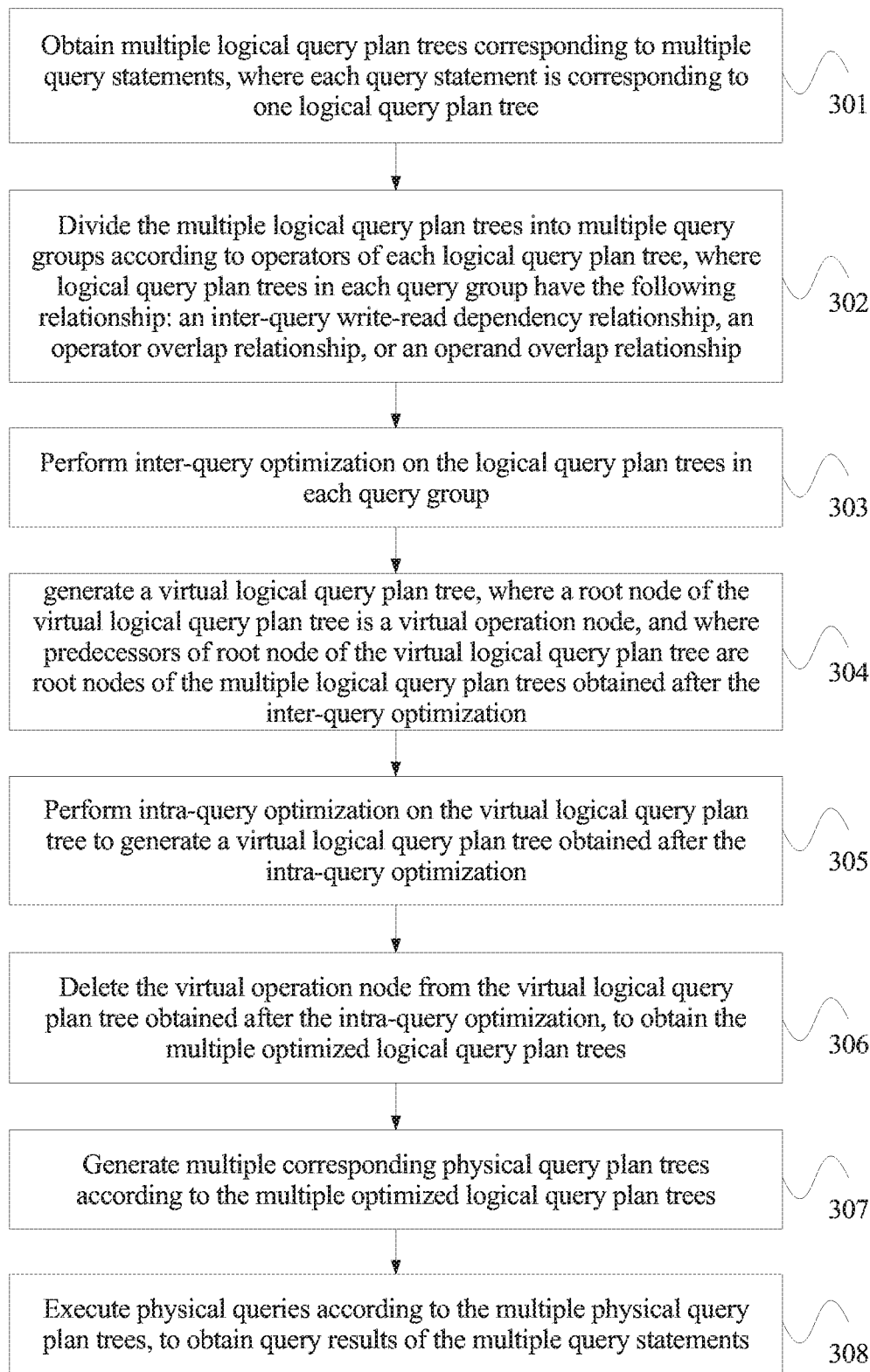
FIG. 3 is a flowchart of a batch data query method according to a third embodiment of the present disclosure.

FIG. 3 is a flowchart of a batch data query method according to a third embodiment of the present disclosure. A difference between this embodiment and the first embodiment is that in this embodiment, overall optimization is further performed between groups after inter-query optimization is performed on each query group. As shown in FIG. 3, the method of this embodiment may include the following steps.

Step 301: Obtain multiple logical query plan trees corresponding to multiple query statements, where each query statement is corresponding to one logical query plan tree.

Step 302: Divide the multiple logical query plan trees into multiple query groups according to operators of each logical query plan tree, where logical query plan trees in each query group have the following relationship: an inter-query write-read dependency relationship, an operator overlap relationship, or an operand overlap relationship.

Step 303: Perform inter-query optimization on the logical query plan trees in each query group.

For specific implementation manners of steps 301 to 303, reference may be made to related description in the first embodiment and that in the second embodiment. Details are not described herein again.

Step 304: generate a virtual logical query plan tree, where a root node of the virtual logical query plan tree is a virtual operation node, and where predecessors of root node of the virtual logical query plan tree are root nodes of the multiple logical query plan trees obtained after the inter-query optimization.

An objective of this step is to combine multiple logical query plan trees obtained after the inter-query optimization into one logical query plan tree. Specifically, a virtual operation node is created, and a successor-predecessor relationship between the virtual operation node and a root node of each logical query plan tree obtained after the inter-query optimization is established. That is, the virtual operation node is used as a root node of each logical query plan tree obtained after the inter-query optimization, so as to form a virtual logical query plan tree. An operator type represented by the virtual operation node is a new type except an existing operator type.

Step 305: Perform intra-query optimization on the virtual logical query plan tree to generate a virtual logical query plan tree obtained after the intra-query optimization.

In step 304, the multiple logical query plan trees obtained after the inter-query optimization are combined into the logical query plan tree, so that optimization can be performed on the virtual logical query plan tree by using an existing intra-query optimization technology. Frequently used intra-query optimization technologies include predicate pushdown optimization, column pruning optimization, task-flow correlation optimization, and the like. Whether to perform optimization on the virtual logical query plan tree may be determined according to an optimization rule or a cost optimization model.

Step 306: Delete the virtual operation node from the virtual logical query plan tree obtained after the intra-query optimization, to obtain the multiple optimized logical query plan trees.

Step 307: Generate multiple physical query plan trees corresponding to the multiple optimized logical query plan trees.

Step 308: Execute physical queries according to the multiple physical query plan trees, to obtain query results of the multiple query statements.

In this embodiment, multiple logical query plan trees obtained after inter-query optimization are combined into one logical query plan tree, and then, intra-query optimization is performed on the combined logical query plan tree to further perform optimization on the multiple logical query plan trees, so as to improve query efficiency of a batch query.

Figure 4:
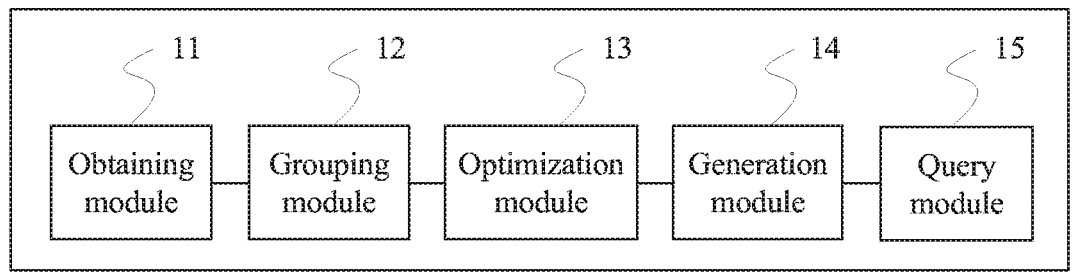
FIG. 4 is a schematic structural diagram of a batch data query apparatus according to a fourth embodiment of the present disclosure.

FIG. 4 is a schematic structural diagram of a batch data query apparatus according to a fourth embodiment of the present disclosure. As shown in FIG. 4, the apparatus provided in this embodiment includes an obtaining module 11, a grouping module 12, an optimization module 13, a generation module 14, and a query module 15.

The obtaining module 11 is configured to obtain multiple logical query plan trees corresponding to multiple query statements. Each query statement is corresponding to one logical query plan tree. Each logical query plan tree in the multiple logical query plan trees includes multiple operators. Each operator of each logical query plan tree includes at least one operand.

The grouping module 12 is configured to divide the multiple logical query plan trees into multiple query groups according to operators of each logical query plan tree. Logical query plan trees in each query group have the following relationship: an inter-query write-read dependency relationship, an operator overlap relationship, or an operand overlap relationship.

The optimization module 13 is configured to perform inter-query optimization on the logical query plan trees in each query group.

The generation module 14 is configured to generate multiple physical query plan trees corresponding to the multiple optimized logical query plan trees.

The query module 15 is configured to execute physical queries according to the multiple physical query plan trees, to obtain query results of the multiple query statements.

Optionally, the optimization module 13 is specifically configured to: determine whether in each query group, a tree structure of a first query subtree is the same as that of a second query subtree, where the first query subtree and the second query subtree belong to two different logical query plan trees in a same query group; if the tree structure of the first query subtree is the same as that of the second query subtree, determine whether a data identifier of an operand of an operator of the first query subtree is the same as a data identifier of an operand of an operator of the second query subtree; and if the data identifier of the operand of the operator of the first query subtree is the same as the data identifier of the operand of the operator of the second query subtree, and the first query subtree is executed before the second query subtree, connect a successor of the second query subtree to the first query subtree, and use the second query subtree as a newly-added successor of the first query subtree, so that the successor of the second query subtree reuses a query result of the first query subtree; or if the data identifier of the operand of the operator of the first query subtree is the same as the data identifier of the operand of the operator of the second query subtree, and the first query subtree is executed after the second query subtree, connect a successor of the first query subtree to the second query subtree, and use the successor of the first query subtree as a newly-added successor of the second query subtree, so that the successor of the first query subtree reuses a query result of the second query subtree.

Optionally, the optimization module 13 is specifically configured to: determine whether a data identifier of an operand corresponding to a filesink operator is the same as a data identifier of an operand corresponding to a scan operator in each query group, where the scan operator and the filesink operator belong to two different logical query plan trees in a same query group; and if the data identifier of the operand corresponding to the filesink operator is the same as the data identifier of the operand corresponding to the scan operator, determine that the logical query plan tree to which the filesink operator belongs has a write-read dependency relationship with the logical query plan tree to which the scan operator belongs, directly connect a predecessor of the filesink operator to a successor of the scan operator, and delete the scan operator.

Optionally, the optimization module 13 is specifically configured to: determine whether in each query group, a data identifier of an operand of a first operator is the same as a data identifier of an operand of a second operator, where the first operator and the second operator belong to two different logical query plan trees in a same query group; and if the data identifier of the operand of the first operator is the same as the data identifier of the operand of the second operator, add a combination identifier for the first operator and the second operator, where the combination identifier is used to combine the first operator and the second operator when the physical query plan trees are generated.

The apparatus in this embodiment may be configured to execute the method in the first method embodiment. Specific implementation manners and technical effects of this embodiment are similar to those of the first method embodiment, and details are not described herein again.

Figure 5:
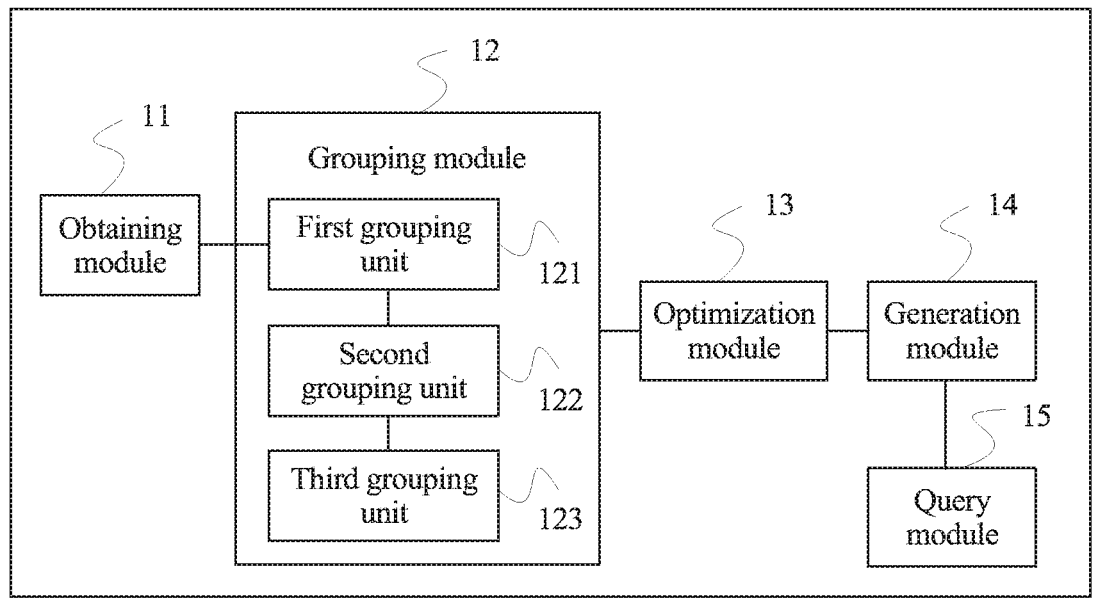
FIG. 5 is a schematic structural diagram of a batch data query apparatus according to a fifth embodiment of the present disclosure.

FIG. 5 is a schematic structural diagram of a batch data query apparatus according to a fifth embodiment of the present disclosure. The apparatus in this embodiment is based on an apparatus structure shown in FIG. 4. Further, the grouping module 12 includes a first grouping unit 121, a second grouping unit 122, and a third grouping unit 123.

The first grouping unit 121 is configured to: determine an inter-query write-read dependency relationship between the logical query plan trees according to the operators of each logical query plan tree and data identifiers of operands of the operators of each logical query plan tree, group, into a first group, all logical query plan trees that have the inter-query write-read dependency relationship, and group, into a second group, all logical query plan trees that do not have the inter-query write-read dependency relationship.

The first grouping unit 121 is further configured to divide the logical query plan trees in the first group into at least one query group according to the inter-query write-read dependency relationship between the logical query plan trees in the first group.

The second grouping unit 122 is configured to: collect statistics about a quantity of operators in each type in each logical query plan tree in the second group, determine an operator overlapping degree between the logical query plan trees according to the quantity of operators in each type in each logical query plan tree, group, into a first subgroup, logical query plan trees in the second group that have an operator overlap relationship, and group, into a second subgroup, other logical query plan trees in the second group except the logical query plan trees in the first subgroup.

The second grouping unit 122 is further configured to divide the logical query plan trees in the first subgroup into at least one query group according to the operator overlapping degree between the logical query plan trees in the first subgroup.

The third grouping unit 123 is configured to: determine an operand overlapping degree between the logical query plan trees in the second subgroup according to data identifiers of operands of operators of each logical query plan tree in the second subgroup, and divide the logical query plan trees in the second subgroup into at least one query group according to the operand overlapping degree between the logical query plan trees in the second subgroup.

Optionally, the first grouping unit 121 is specifically configured to: separately determine whether a data identifier of each operand whose value is determined by a filesink operator of each logical query plan tree is the same as a data identifier of each operand of a scan operator of another logical query plan tree in the multiple logical query plan trees; and if the data identifier of each operand whose value is determined by the filesink operator of each logical query plan tree is the same as the data identifier of each operand of the scan operator of the another logical query plan tree in the multiple logical query plan trees, determine that the logical query plan tree including the filesink operator has an inter-query write-read dependency relationship with the logical query plan tree including the scan operator.

Optionally, the second grouping unit 122 is specifically configured to: separately compare a quantity of operators in each type in each logical query plan tree in the second group with a quantity of operators in each type in another logical query plan tree in the second group; and if the quantities of operators in each type in the two logical query plan trees in the second group are equal, use a sum of quantities of operators in the types as an operator overlapping degree between the two logical query plan trees in a comparison process, where the comparison process includes a process of comparing one logical query plan tree with any other logical query plan tree in the second group.

Further, the optimization module 13 is further configured to: generate a virtual logical query plan tree, where a root node of the virtual logical query plan tree is a virtual operation node, and where predecessors of root node of the virtual logical query plan tree are root nodes of the multiple logical query plan trees obtained after the inter-query optimization; perform intra-query optimization on the virtual logical query plan tree to generate a virtual logical query plan tree obtained after the intra-query optimization; and delete the virtual operation node from the virtual logical query plan tree obtained after the intra-query optimization, to obtain the multiple optimized logical query plan trees.

The apparatus in this embodiment may be configured to execute the methods in the second embodiment and the third embodiment. Implementation principles and technical effects of this embodiment of this embodiment are similar to those of the first method embodiment, and details are not described herein again.

Figure 6:
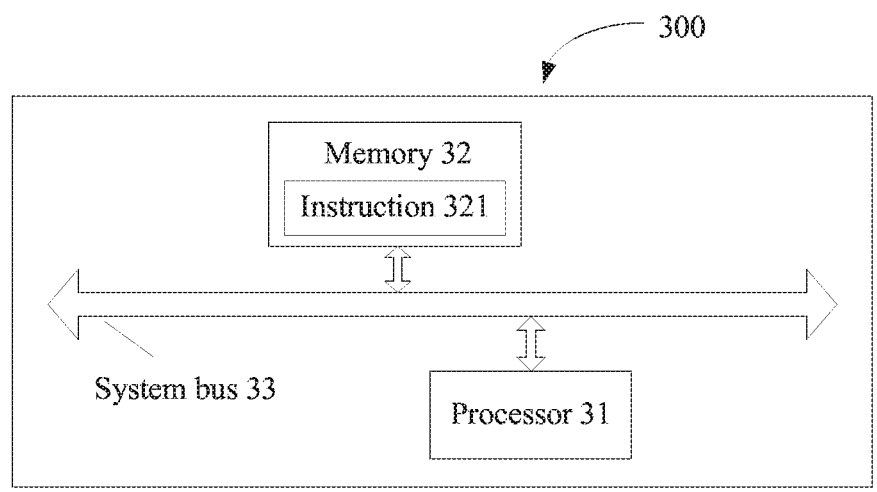
FIG. 6 is a schematic structural diagram of a batch data query apparatus according to a sixth embodiment of the present disclosure.

FIG. 6 is a schematic structural diagram of a batch data query apparatus according to a sixth embodiment of the present disclosure. As shown in FIG. 6, a batch data query apparatus 300 in this embodiment includes a processor 31, a memory 32, and a system bus 33. The processor 31 and the memory 32 are connected and complete mutual communication by using the system bus 33. The memory 32 is configured to store a computer execution instruction 321. The processor 31 is configured to run the computer execution instruction 321 to execute the following method: obtaining multiple logical query plan trees corresponding to multiple query statements, where each query statement is corresponding to one logical query plan tree, each logical query plan tree in the multiple logical query plan trees includes multiple operators, and each operator of each logical query plan tree includes at least one operand; dividing the multiple logical query plan trees into multiple query groups according to operators of each logical query plan tree, where logical query plan trees in each query group have the following relationship: an inter-query write-read dependency relationship, an operator overlap relationship, or an operand overlap relationship; performing inter-query optimization on the logical query plan trees in each query group; generating multiple physical query plan trees corresponding to the multiple optimized logical query plan trees; and executing physical queries according to the multiple physical query plan trees, to obtain query results of the multiple query statements.

Optionally, the dividing the multiple logical query plan trees into multiple query groups according to operators of each logical query plan tree includes: determining an inter-query write-read dependency relationship between the logical query plan trees according to the operators of each logical query plan tree and data identifiers of operands of the operators of each logical query plan tree, grouping, into a first group, all logical query plan trees that have the inter-query write-read dependency relationship, and grouping, into a second group, all logical query plan trees that do not have the inter-query write-read dependency relationship; dividing the logical query plan trees in the first group into at least one query group according to the inter-query write-read dependency relationship between the logical query plan trees in the first group; collecting statistics about a quantity of operators in each type in each logical query plan tree in the second group, determining an operator overlapping degree between the logical query plan trees according to the quantity of operators in each type in each logical query plan tree, grouping, into a first subgroup, logical query plan trees in the second group that have an operator overlap relationship, and grouping, into a second subgroup, other logical query plan trees in the second group except the logical query plan trees in the first subgroup; dividing the logical query plan trees in the first subgroup into at least one query group according to the operator overlapping degree between the logical query plan trees in the first subgroup; and determining an operand overlapping degree between the logical query plan trees in the second subgroup according to data identifiers of operands of operators of each logical query plan tree in the second subgroup, and dividing the logical query plan trees in the second subgroup into at least one query group according to the operand overlapping degree between the logical query plan trees in the second subgroup.

In this embodiment, the determining an inter-query write-read dependency relationship between the logical query plan trees according to the operators of each logical query plan tree and data identifiers of operands of the operators of each logical query plan tree includes: separately determining whether a data identifier of each operand whose value is determined by a filesink operator of each logical query plan tree is the same as a data identifier of each operand of a scan operator of another logical query plan tree in the multiple logical query plan trees; and if the data identifier of each operand whose value is determined by the filesink operator of each logical query plan tree is the same as the data identifier of each operand of the scan operator of the another logical query plan tree in the multiple logical query plan trees, determining that the logical query plan tree including the filesink operator has an inter-query write-read dependency relationship with the logical query plan tree including the scan operator.

In this embodiment, the determining an operator overlapping degree between the logical query plan trees according to the quantity of operators in each type in each logical query plan tree includes: separately comparing a quantity of operators in each type in each logical query plan tree in the second group with a quantity of operators in each type in another logical query plan tree in the second group; and if the quantities of operators in each type in the two logical query plan trees in the second group are equal, using a sum of quantities of operators in the types as an operator overlapping degree between the two logical query plan trees in a comparison process, where the comparison process includes a process of comparing one logical query plan tree with any other logical query plan tree in the second group.

Optionally, the performing inter-query optimization on the logical query plan trees in each query group includes: determining whether in each query group, a tree structure of a first query subtree is the same as that of a second query subtree, where the first query subtree and the second query subtree belong to two different logical query plan trees in a same query group; if the tree structure of the first query subtree is the same as that of the second query subtree, determining whether a data identifier of an operand of an operator of the first query subtree is the same as a data identifier of an operand of an operator of the second query subtree; and if the data identifier of the operand of the operator of the first query subtree is the same as the data identifier of the operand of the operator of the second query subtree, and the first query subtree is executed before the second query subtree, connecting a successor of the second query subtree to the first query subtree, and using the second query subtree as a newly-added successor of the first query subtree, so that the successor of the second query subtree reuses a query result of the first query subtree; or if the data identifier of the operand of the operator of the first query subtree is the same as the data identifier of the operand of the operator of the second query subtree, and the first query subtree is executed after the second query subtree, connecting a successor of the first query subtree to the second query subtree, and using the successor of the first query subtree as a newly-added successor of the second query subtree, so that the successor of the first query subtree reuses a query result of the second query subtree.

Optionally, the performing inter-query optimization on the logical query plan trees in each query group includes: determining whether a data identifier of an operand corresponding to a filesink operator is the same as a data identifier of an operand corresponding to a scan operator in each query group, where the scan operator and the filesink operator belong to two different logical query plan trees in a same query group; and if the data identifier of the operand corresponding to the filesink operator is the same as the data identifier of the operand corresponding to the scan operator, determining that the logical query plan tree to which the filesink operator belongs has a write-read dependency relationship with the logical query plan tree to which the scan operator belongs, directly connecting a predecessor of the filesink operator to a successor of the scan operator, and deleting the scan operator.

Optionally, the performing inter-query optimization on the logical query plan trees in each query group includes: determining whether in each query group, a data identifier of an operand of a first operator is the same as a data identifier of an operand of a second operator, where the first operator and the second operator belong to two different logical query plan trees in a same query group; and if the data identifier of the operand of the first operator is the same as the data identifier of the operand of the second operator, adding a combination identifier for the first operator and the second operator, where the combination identifier is used to combine the first operator and the second operator when the physical query plan trees are generated.

Optionally, before the generating multiple physical query plan trees corresponding to the multiple optimized logical query plan trees, the method further includes: generating a virtual logical query plan tree, where a root node of the virtual logical query plan tree is a virtual operation node, and where predecessors of root node of the virtual logical query plan tree are root nodes of the multiple logical query plan trees obtained after the inter-query optimization; performing intra-query optimization on the virtual logical query plan tree to generate a virtual logical query plan tree obtained after the intra-query optimization; and deleting the virtual operation node from the virtual logical query plan tree obtained after the intra-query optimization, to obtain the multiple optimized logical query plan trees.

The apparatus in this embodiment may be configured to execute the technical solution in any method embodiment of the first embodiment to the third embodiment. Implementation principles and technical effects of this embodiment of this embodiment are similar to those of the first method embodiment, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read only memory (ROM), a random access memory (RAM), a magnetic disk, or an optical disc.

Finally, it should be noted that the foregoing embodiments are merely intended for describing the technical solutions of the present disclosure, but not for limiting the present disclosure.

What is claimed is:

1. A method, comprising:
obtaining, by a batch data query apparatus, multiple logical query plan trees corresponding to multiple query statements, wherein query statements of the multiple query statements correspond to multiple logical query plan trees, wherein logical query plan trees of the multiple logical query plan trees comprise multiple operators, and wherein operators of the multiple operators comprise at least one operand;

dividing the multiple logical query plan trees into multiple query groups according to operators of the multiple logical query plan trees, wherein logical query plan trees in query groups of the multiple query groups have a relationship comprising an inter-query write-read dependency relationship, an operator overlap relationship, or an operand overlap relationship;

performing inter-query optimization on the logical query plan trees in the query groups to produce multiple optimized logical query plan trees;

generating multiple physical query plan trees corresponding to the multiple optimized logical query plan trees; and executing, by the batch data query apparatus, physical queries according to the multiple physical query plan trees, to obtain query results of the multiple query statements.

2. The method according to claim 1, wherein dividing the multiple logical query plan trees into the multiple query groups comprises:

determining an inter-query write-read dependency relationship between the logical query plan trees according to the operators of the logical query plan trees and data identifiers of operands of the operators of the logical query plan trees;

grouping, into a first group, logical query plan trees that have the inter-query write-read dependency relationship;

grouping, into a second group, logical query plan trees that do not have the inter-query write-read dependency relationship;

dividing the logical query plan trees in the first group into at least one query group according to the inter-query write-read dependency relationship between the logical query plan trees in the first group;

collecting statistics about a quantity of operators in type in the logical query plan trees in the second group;

determining an operator overlapping degree between the logical query plan trees according to the quantity of operators in the types in the logical query plan trees in the second group;

grouping, into a first subgroup, logical query plan trees in the second group that have an operator overlap relationship;

grouping, into a second subgroup, logical query plan trees in the second group not in the first subgroup;

dividing the logical query plan trees in the first subgroup into at least one query group according to the operator overlapping degree between the logical query plan trees in the first subgroup;

determining an operand overlapping degree between the logical query plan trees in the second subgroup according to data identifiers of operands of operators of the logical query plan trees in the second subgroup; and dividing the logical query plan trees in the second subgroup into at least one query group according to the operand overlapping degree between the logical query plan trees in the second subgroup.

3. The method according to claim 2, wherein determining the inter-query write-read dependency relationship between the logical query plan trees comprises:

separately determining whether data identifiers of operands having values determined by a filesink operator of the logical query plan trees are the same as data identifiers of operands of operators of a scan operator of another logical query plan tree in the multiple logical query plan trees; and determining that the logical query plan trees of the filesink operator has an inter-query write-read dependency relationship with the logical query plan trees of the scan operator, in response to the data identifiers of operands having values determined by the filesink operators are the same as the data identifiers of operands of the scan operator of another logical query plan tree in the multiple logical query plan trees.

4. The method according to claim 2, wherein determining the operator overlapping degree between the logical query plan trees comprises:

separately comparing a quantity of operators in types in the logical query plan trees in the second group with a quantity of operators in types in another logical query plan tree in the second group; and using a sum of quantities of operators in the types as an operator overlapping degree between two logical query plan trees in a comparison process, in response to the quantities of operators in the types in the two logical query plan trees in the second group are equal, wherein the comparison process comprises a process of comparing one logical query plan tree with another logical query plan tree in the second group.

5. The method according to claim 1, wherein performing inter-query optimization on the logical query plan trees in the query groups comprises:

determining whether, in the query groups, a tree structure of a first query subtree is the same as a tree structure of a second query subtree, wherein the first query subtree and the second query subtree belong to different logical query plan trees in a same query group;

determining whether a data identifier of an operand of an operator of the first query subtree is the same as a data identifier of an operand of an operator of the second query subtree, in response to the tree structure of the first query subtree being the same as the tree structure of the second query subtree; and connecting a successor of the second query subtree to the first query subtree; and using the second query subtree as a newly-added successor of the first query subtree, in response to the data identifier of the operand of the operator of the first query subtree being the same as the data identifier of the operand of the operator of the second query subtree, and wherein the first query subtree is executed before the second query subtree, so that the successor of the second query subtree reuses a query result of the first query subtree.

6. The method according to claim 1, wherein performing inter-query optimization on the logical query plan trees in the query groups comprises:

determining whether, in the query groups, a tree structure of a first query subtree is the same as a tree structure of a second query subtree, wherein the first query subtree and the second query subtree belong to different logical query plan trees in a same query group;

determining whether a data identifier of an operand of an operator of the first query subtree is the same as a data identifier of an operand of an operator of the second query subtree, in response to the tree structure of the first query subtree being the same as the tree structure of the second query subtree; and connecting a successor of the first query subtree to the second query subtree; and using the successor of the first query subtree as a newly-added successor of the second query subtree, in response to the data identifier of the operand of the operator of the first query subtree being the same as the data identifier of the operand of the operator of the second query subtree, and wherein the first query subtree is executed after the second query subtree, so that the successor of the first query subtree reuses a query result of the second query subtree.

7. The method according to claim 1, wherein performing inter-query optimization on the logical query plan trees in the query groups comprises:
determining whether a data identifier of an operand corresponding to a filesink operator is the same as a data identifier of an operand corresponding to a scan operator in the query groups, wherein the scan operator and the filesink operator belong to different logical query plan trees in a same query group;
determining that the logical query plan trees to which the filesink operator belongs has a write-read dependency relationship with the logical query plan trees to which the scan operator belongs, in response to the data identifier of the operand corresponding to the filesink operator being the same as the data identifier of the operand corresponding to the scan operator;
directly connecting a predecessor of the filesink operator to a successor of the scan operator; and
deleting the scan operator.

8. The method according to claim 1, wherein performing inter-query optimization on the logical query plan trees in the query groups comprises:
determining whether, in the query groups, a data identifier of an operand of a first operator is the same as a data identifier of an operand of a second operator, wherein the first operator and the second operator belong to different logical query plan trees in a same query group; and
adding a combination identifier for the first operator and the second operator, in response to the data identifier of the operand of the first operator being the same as the data identifier of the operand of the second operator, wherein the combination identifier is used to combine the first operator and the second operator in response to the physical query plan trees being generated.

9. The method according to claim 1, wherein the method further comprises:
generating a virtual logical query plan tree, wherein a root node of the virtual logical query plan tree is a virtual operation node, and wherein predecessors of root node of the virtual logical query plan tree are root nodes of the multiple logical query plan trees obtained after the inter-query optimization;
performing intra-query optimization on the virtual logical query plan tree to generate a virtual logical query plan tree obtained after the intra-query optimization; and
deleting the virtual operation node from the virtual logical query plan tree obtained after the intra-query optimization, to obtain the multiple optimized logical query plan trees, before generating the multiple physical query plan trees corresponding to the multiple optimized logical query plan trees.

10. A batch data query apparatus, comprising:
a processor; and
a non-transitory computer readable storage medium storing a program for execution by the processor, the program including instructions to:
obtain multiple logical query plan trees corresponding to multiple query statements, wherein query statements in the multiple query statements correspond to logical query plan trees, wherein the logical query plan trees in the multiple logical query plan trees comprise multiple operators, and wherein operators of the logical query plan trees comprise at least one operand;
divide the multiple logical query plan trees into multiple query groups according to operators of the logical query plan trees, wherein logical query plan trees in the query groups have a relationship comprising an inter-query write-read dependency relationship, an operator overlap relationship, or an operand overlap relationship;
perform inter-query optimization on the logical query plan trees in the query groups to produce multiple optimized logical query plan trees;
generate multiple physical query plan trees corresponding to the multiple optimized logical query plan trees; and
execute physical queries according to the multiple physical query plan trees, to obtain query results of the multiple query statements.

11. The batch data query apparatus according to claim 10, wherein the instructions further comprise instructions to:
determine an inter-query write-read dependency relationship between the logical query plan trees according to the operators of the logical query plan trees and data identifiers of operands of the operators of the logical query plan trees;
group, into a first group, logical query plan trees that have the inter-query write-read dependency relationship;
group, into a second group, logical query plan trees that do not have the inter-query write-read dependency relationship;
divide the logical query plan trees in the first group into at least one query group according to the inter-query write-read dependency relationship between the logical query plan trees in the first group;
collect statistics about a quantity of operators in types in the logical query plan trees in the second group;
determine an operator overlapping degree between the logical query plan trees according to the quantity of operators in the types in the logical query plan tree;
group, into a first subgroup, logical query plan trees in the second group that have an operator overlap relationship;
group, into a second subgroup, logical query plan trees in the second group that are not in the first subgroup;
divide the logical query plan trees in the first subgroup into at least one query group according to the operator overlapping degree between the logical query plan trees in the first subgroup;
determine an operand overlapping degree between the logical query plan trees in the second subgroup according to data identifiers of operands of operators of the logical query plan trees in the second subgroup; and
divide the logical query plan trees in the second subgroup into at least one query group according to the operand overlapping degree between the logical query plan trees in the second subgroup.

12. The batch data query apparatus according to claim 11, wherein the instructions further comprise instructions to:
separately determine whether a data identifier of operands having values determined by a filesink operator of the logical query plan trees is the same as a data identifier of operands of a scan operator of another logical query plan tree in the multiple logical query plan trees; and determine that the logical query plan trees comprising the filesink operator has an inter-query write-read dependency relationship with the logical query plan trees of the scan operator, in response to the data identifier of operands having values determined by the filesink operator of the logical query plan trees is the same as the data identifier of operands of the scan operator of another logical query plan tree in the multiple logical query plan trees.

13. The batch data query apparatus according to claim 11, wherein the instructions further comprise instructions to:

separately compare a quantity of operators in types in the logical query plan trees in the second group with a quantity of operators in type in another logical query plan tree in the second group; and use a sum of quantities of operators in the types as an operator overlapping degree between the logical query plan trees in a comparison process, in response to the quantities of operators in the types in the logical query plan trees in the second group are equal, wherein the comparison process comprises a process of comparing one logical query plan tree with any another logical query plan tree in the second group.

14. The batch data query apparatus according to claim 10, wherein the instructions further comprise instructions to:

determine whether, in the query groups, a tree structure of a first query subtree is the same as a tree structure of a second query subtree, wherein the first query subtree and the second query subtree belong to different logical query plan trees in a same query group;

determine whether a data identifier of an operand of an operator of the first query subtree is the same as a data identifier of an operand of an operator of the second query subtree, in response to the tree structure of the first query subtree being the same as the tree structure of the second query subtree;

connect a successor of the second query subtree to the first query subtree; and use the second query subtree as a newly-added successor of the first query subtree, in response to the data identifier of the operand of the operator of the first query subtree being the same as the data identifier of the operand of the operator of the second query subtree, and wherein the first query subtree is executed before the second query subtree, so that the successor of the second query subtree reuses a query result of the first query subtree.

15. The batch data query apparatus according to claim 10, wherein the instructions further comprise instructions to:

determine whether, in the query groups, a tree structure of a first query subtree is the same as a tree structure of a second query subtree, wherein the first query subtree and the second query subtree belong to different logical query plan trees in a same query group;

determine whether a data identifier of an operand of an operator of the first query subtree is the same as a data identifier of an operand of an operator of the second query subtree, in response to the tree structure of the first query subtree being the same as the tree structure of the second query subtree;

connect a successor of the first query subtree to the second query subtree; and use the successor of the first query subtree as a newly-added successor of the second query subtree, in response to the data identifier of the operand of the operator of the first query subtree being the same as the data identifier of the operand of the operator of the second query subtree, and wherein the first query subtree is executed after the second query subtree, so that the successor of the first query subtree reuses a query result of the second query subtree.

16. The batch data query apparatus according to claim 10, wherein the instructions further comprise instructions to:

determine whether a data identifier of an operand corresponding to a filesink operator is the same as a data identifier of an operand corresponding to a scan operator in the query groups, wherein the scan operator and the filesink operator belong to different logical query plan trees in a same query group;

determine that the logical query plan trees to which the filesink operator belongs has a write-read dependency relationship with the logical query plan trees to which the scan operator belongs, in response to the data identifier of the operand corresponding to the filesink operator being the same as the data identifier of the operand corresponding to the scan operator;

directly connect a predecessor of the filesink operator to a successor of the scan operator; and delete the scan operator.

17. The batch data query apparatus according to claim 10, wherein the instructions further comprise instructions to:

determine whether, in the query groups, a data identifier of an operand of a first operator is the same as a data identifier of an operand of a second operator, wherein the first operator and the second operator belong to different logical query plan trees in a same query group; and add a combination identifier for the first operator and the second operator, in response to the data identifier of the operand of the first operator being the same as the data identifier of the operand of the second operator, wherein the combination identifier is used to combine the first operator and the second operator, in response to the physical query plan trees being generated.

18. The batch data query apparatus according to claim 10, wherein the instructions further comprise instructions to:

generate a virtual logical query plan tree, wherein a root node of the virtual logical query plan tree is a virtual operation node, and wherein predecessors of root node of the virtual logical query plan tree are root nodes of the multiple logical query plan trees obtained after the inter-query optimization;

perform intra-query optimization on the virtual logical query plan tree to generate a virtual logical query plan tree obtained after the intra-query optimization; and delete the virtual operation node from the virtual logical query plan tree obtained after the intra-query optimization, to obtain the multiple optimized logical query plan trees.

19. A non-transitory computer readable storage medium storing a program for execution by a processor of a batch data query apparatus, the program including instructions to:

obtain multiple logical query plan trees corresponding to multiple query statements, wherein query statements in the multiple query statements correspond to logical query plan trees, wherein the logical query plan trees in the multiple logical query plan trees comprise multiple operators, and wherein operators of the logical query plan trees comprise at least one operand;

divide the multiple logical query plan trees into multiple query groups according to operators of the logical query plan trees, wherein logical query plan trees in the query groups have a relationship comprising an inter-query write-read dependency relationship, an operator overlap relationship, or an operand overlap relationship;

perform inter-query optimization on the logical query plan trees in the query groups to produce multiple optimized logical query plan trees;

generate multiple physical query plan trees corresponding to the multiple optimized logical query plan trees; and execute physical queries according to the multiple physical query plan trees, to obtain query results of the multiple query statements.

* * * * *